3,463,824
PROCESS FOR THE METHYLATION OF PHENOL
Günter Velling, Hersel, near Bonn, Germany, assignor to Union Rheinische Braunkohlen Kraftstoff Aktiengesellschaft, Wesseling, near Cologne, Germany, a corporation of Germany
No Drawing. Filed Apr. 26, 1966, Ser. No. 545,295
Claims priority, application Germany, May 3, 1965, U 11,684
Int. Cl. C07c 37/16
U.S. Cl. 260—621      4 Claims

ABSTRACT OF THE DISCLOSURE

In the production of alkylated phenols at temperatures of between 180 and 240° C. with an aqueous catalyst solution containing zinc halide and hydrogen halide, the improvement of reducing the formation of higher alkylated products by conducting the reaction in the presence of a reducing agent.

---

This invention realtes to a process for the alkylation of phenol and its derivatives.

It is known that alkyl groups can be added to phenol and its derivates in the presence of catalysts containing zinc halide. One example of a suitable catalyst is an aqueous mixture of zinc bromide and hydrogen bromide. Apart from mono- and di-alkylated phenols, tri- and higher alkylated compounds are always formed during alkylation, together with resin-like compounds which are formed in quantities that depend on the reaction conditions and which are left behind as residue when the reaction products are separated by distillation.

It has now been found that the formation of higher alkylated compounds in the conventional alkylation of phenol or its derivates at temperatures of between about 180° and 240° C. with aqueous catalyst solutions containing zinc halide and hydrogen halide, can be appreciably reduced if the presence during alkylation of elementary halogen, dissolved oxygen and other oxidizing compounds is avoided by the addition of reducing substances which do not have any effect on alkylation. When alkylation is carried out by the conventional method, traces of elementary halogen are formed, particulary from the hydrogen halide usually present in the catalyst solution, under the influence of, for example, the oxygen dissolved in the starting products. It has surprisingly been found that even small quantities of such halogen are sufficient to promote the formation of tri- and higher alkylated products. In addition, these small quantities of halogen remain in the recovered products of alkylation. During the separation of these products by distillation, halogenated phenols are formed which show a tendency towards resin formation and interference with separation.

The present invention provides a process for the alkylation of phenol or derivatives of phenol with an alkylating agent in the presence of a catalyst solution containing a zinc halide and a hydrogen halide which comprises reacting the phenol or a derivative of phenol in the presence of a reducing agent that does not interfere with, or yield products that interfere with, the reactants.

The absence of traces of elementary halogen as required in accordance with the invention can be obtained in many ways. Thus, precautions can be taken to ensure that no gaseous or dissolved oxygen passes into the catalyst solution with the starting products, for example phenol and an olefin. Even very small quanities of dissolved oxygen in the starting products are sufficient to give rise to the aforementioned disadvantages. An alternative method is to work in the presence of hydrogen, particularly at elevated pressure, in which case the hydrogen is preferably added to the starting product before it is heated in order to inhibit the formation of halogenated phenols which, in some cases, can even take place at this initial stage. The addition of reducing agents to the starting products would appear to be of particular advantage, in which case the reducing agent may be added either to one of the starting components, for example the alkylating agent, which may be an alcohol, an ether, an alkyl halide or an olefin, or to the reaction mixture comprising, for example, phenol, alcohol and catalyst solution. Naturally, the reducing agents used should not be of the type whose reaction products would interfere with alkylation or with the working-up of the alkylated products. Thus, the addition of hydroquinone, for example, has proved to be perfectly suitable, whilst hydrazine, for example, is not suitable because ammonia is formed from it and affects the reaction. The addition of powdered zinc has proved to be particularly suitable, e.g. between 0.1 and 1 g. per 100 l. of starting products.

Example.—0.5 g. of powdered zinc per 100 l. of starting products were added during the otherwise conventional alkylation of phenol with methanol as the alkylating agent at a temperature of about 220 C. and in the presence of an aqueous solution containing 80% by weight zinc bromire activated with 5% hydrogen bromide. The formation of higher alkylated products was only 4% by weight (based on the phenol and methanol used). By repeating the experiment in the conventional manner without addition of zinc the yield of higher alkylated products was 12% by weight.

What we claim is:

1. In the process for the methylation of phenol with methanol in the presence of an aqueous catalyst solution containing zinc halide and hydrogen halide at temperatures in the range of 180–240° C., the improvement which comprises reducing the formation of higher alkylated products by methylating phenol in the presence of a reducing agent selected from the group consisting of hydrogen, zinc dust and hydroquinone.

2. A process as claimed in claim 1 wherein the reducing agent is zinc dust.

3. A process as claimed in claim 1 wherein the reducing agent is hydroquinone.

4. A process as claimed in claim 1 wherein the reducing agent is hydrogen.

References Cited

FOREIGN PATENTS 947,172    1/1964    Great Britain.

BERNARD HELFIN, Primary Examiner

U.S. Cl. X.R.

260—624